United States Patent [19]
Urkowitz et al.

[11] 3,742,501
[45] June 26, 1973

[54] RADAR APPARATUS WITH DIRECTIONAL DISCRIMINATION AND INCREASED RADAR SENSITIVITY

[75] Inventors: Harry Urkowitz, Philadelphia, Pa.; Samuel M. Sherman, Moorestown, N.J.

[73] Assignee: The United States of America as represented by the Secretary of the Air Force, Washington, D.C.

[22] Filed: Mar. 21, 1972

[21] Appl. No.: 236,630

[52] U.S. Cl. .................................. 343/7.7, 343/8
[51] Int. Cl. .............................................. G01s 9/42
[58] Field of Search .............................. 343/7.7, 8

[56] References Cited
UNITED STATES PATENTS

| | | |
|---|---|---|
| 3,046,548 | 7/1962 | Briskin .................................. 343/7.7 |
| 3,603,996 | 9/1971 | Murchison ............................ 343/7.7 |
| 3,680,098 | 7/1972 | Harris et al. ......................... 343/7.7 |

Primary Examiner—T. H. Tubbesing
Attorney—Harry A. Herbert, Jr. et al.

[57] ABSTRACT

A radar apparatus with directional discrimination and improved detection is provided. A monostatic radar system has its transmitter and receiving antenna at the same location. Target motion toward or away from the radar is discovered by determining the direction of the doppler frequency shift imposed upon the reflected electromagnetic energy after impinging on a target. Directional capability is obtained by determining whether the doppler frequency shift is positive or negative and simultaneously there is also provided increased radar signal sensitivity.

3 Claims, 1 Drawing Figure

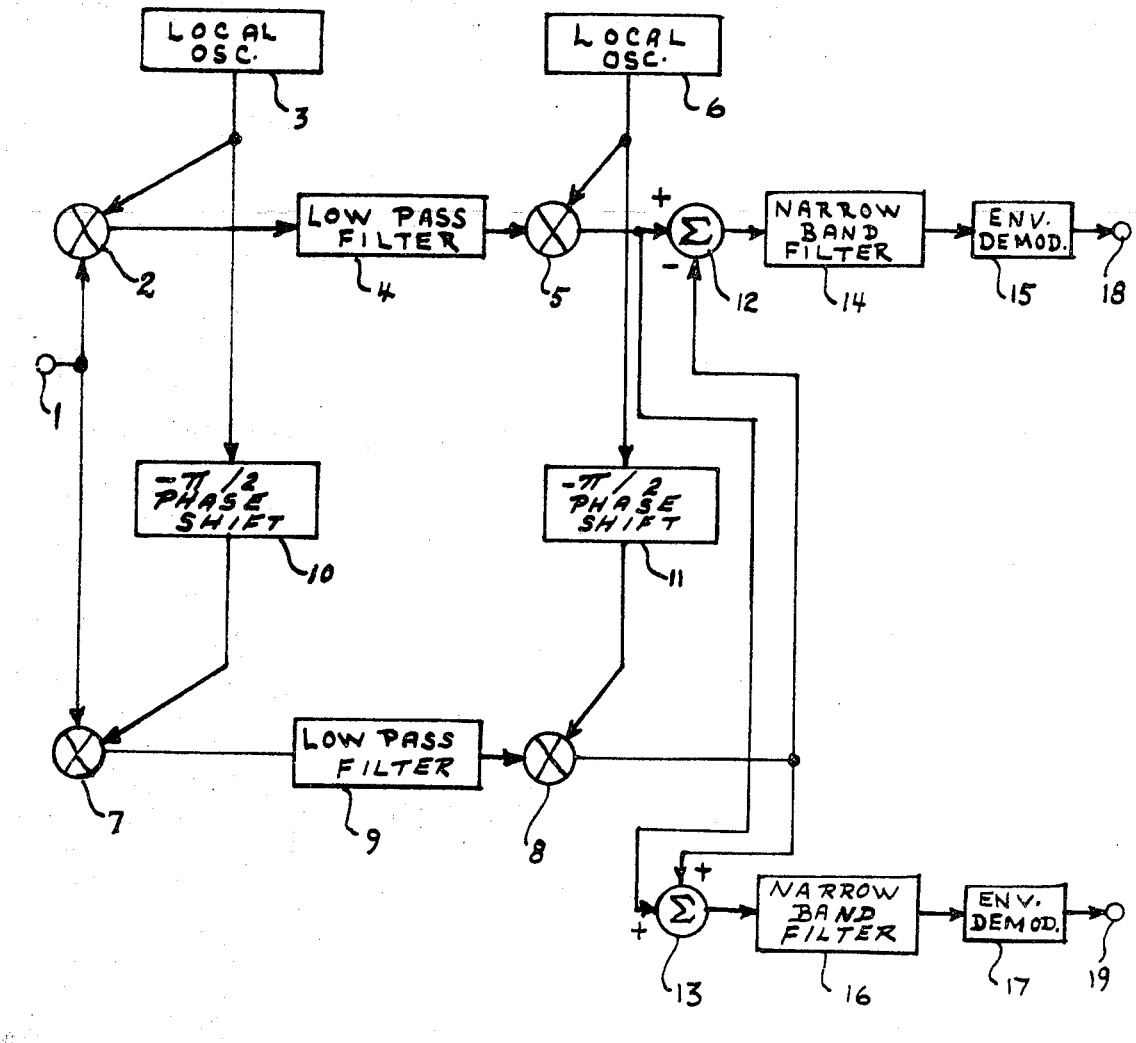

RADAR APPARATUS WITH DIRECTIONAL DISCRIMINATION AND INCREASED RADAR SENSITIVITY

BACKGROUND OF THE INVENTION

The present invention relates to a monostatic radar apparatus and particularly a monostatic radar apparatus providing a directional capability by determining whether the doppler shift is positive or negative and also simultaneously providing improved target detection.

This invention is a means for obtaining improved radar detection capability and for simultaneously determining whether a detected radar target is approaching or receding from a monostatic radar. A monostatic radar system has its transmitting and receiving antenna at the same location. Target motion toward or away from the radar may be discovered by determining the direction of the doppler frequency shift imposed upon the reflected electromagnetic energy after impinging upon a target. Directional capability is obtained by determining whether the doppler frequency shift is positive or negative. There are additional benefits obtained by restricting the radar response to a particular sign and magnitude of doppler shift. Extraneous fluctuation noise (sometimes called thermal noise) corresponding to the opposite sign of doppler shift is eliminated. Unwanted radar reflection from the ground, sea and other extraneous reflectors (collectively called clutter) usually have both positive and negative doppler shifts. The reflection having a doppler shift of opposite sign from that of a desired target is eliminated.

The particular embodiment covered by the present invention is an improvement over means presently employed to discriminate moving targets from stationary targets and to determine the direction of motion (approaching or receding). For example, with prior art a so-called "coherent video" filtering technique was utilized which was intended to discriminate in favor of targets having a particular magnitude of doppler frequency shift $f_d$. This is called a "single phase" embodiment because it does not extract and use the quadrature phase. The intermediate frequency (IF) reference or carrier frequency is designated $f_c$. The IF part of the receiver is heterodyned or mixed with the output of a first local oscillator at the carrier frequency. The first mixer output is filtered by a lowpass filter to remove image components whose frequencies are near $2 f_c$. The lowpass filter output is heterodyned further with the output of a second local oscillator whose output frequency $Lf_1$. The purpose of this mixing process is to place the frequency of the quantities to be filtered at such values that the physical task of filtering may be economically achieved. A narrowband filter follows a second mixer. This filter is tuned to a frequency which differs from the frequency $f_l$ by the magnitude of the desired doppler shift $f_d$. This narrowband filter is followed by an envelope demodulator whose output is applied to a threshold and/or display for detection, display, and other purposes. The filter may be nonperiodic or periodic depending upon whether the input has or has not been range gated. However, the single phase embodiment, as described, lacks directional discrimination. Target signals having a positive or negative doppler shift of magnitude $f_d$ will pass this filter. Furthermore, since both senses of doppler shift are passed, extraneous noise and clutter are passed.

In the prior art directional indication may be added to the aforedescribed embodiment. This is called single phase coherent video doppler filtering with direction determination. The doppler filtering is identical. The direction of target motion is obtained by the use of a "quadrature phase" channel, requiring two additional mixers, an additional doppler filter, and a phase comparator. The sign of the phase comparator output indicates the sign of the doppler shift. $\pi/2$ output indicates approach; $-\pi/2$ indicates recede. It should be noted that the detection of target presence is not aided at all by the use of the aforementioned quadrature component.

The present invention utilizes a unique quadrature channel to simultaneously aid detection as well as provide indicated direction and it is called double phase coherent video doppler filtering having inherent directional capability.

SUMMARY OF THE INVENTION

A radar apparatus is provided having simultaneously increased radar signal sensitivity and directional discrimination. The target signal from a monostatic radar is processed through a receiver which converts it to the representative intermediate frequency (IF) signal $f_c$. The IF signal is mixed with a first local oscillator signal at the intermediate frequency utilizing a first mixer. The mixer output is lowpass filtered to remove image components. The lowpass filter output is heterodyned in the second mixer with the output signal $f_l$ of a second local oscillator. To obtain the direction of target motion a "quadrature phase" channel is employed including a third and fourth mixer. The third mixer heterodynes the IF signal and a phase shifted first local oscillator signal. The fourth mixer heterodynes the filtered output signal of the third mixer with the phase shifted second oscillator signal. The output of the fourth mixer is subtracted from the output of the second mixer to detect a positive doppler shift and added to detect negative doppler shift. The negative and positive signals are subsequently detected to provide directional signal and improved filtered detected signals.

An object of the invention is to provide a radar apparatus ensuring improved radar detection capability and simultaneously determining whether a detected target is approaching or receding.

DESCRIPTION OF THE DRAWING

The single FIGURE of the invention shows in block diagram form a preferred embodiment.

DETAILED DESCRIPTION OF THE PREFERRED EMBODIMENT

Now referring in detail to the single FIGURE of the invention which includes double phase coherent video doppler filtering with inherent directional capability, which is utilized with a monostatic radar system having its transmitter and receiver at the same location. Target motion toward or away from the radar is discovered by determining the direction of the doppler shift imposed upon the reflected electromagnetic energy after impinging upon the target of interest. Directional capability is obtained by determining whether the doppler frequency shift is negative or positive. The target of interest returns the aforesaid reflected electromagnetic energy and it passes through the aforesaid receiver which provides a representative IF signal to input terminal 1.

The intermediate frequency (IF) reference or carrier frequency is designated $f_c$. The IF input signal is heterodyned by mixer 2 with the output of local oscillator 3 at the carrier frequency. The output signal from mixer 2 is filtered by lowpass filter 4 to remove image components whose frequencies are near $2f_c$. The lowpass filter output is heterodyned further in mixer 5 with the output of local oscillator 6. Local oscillator 6 has an output signal with a frequency of $f_l$. The purpose of this mixing process is to place the frequency of the quantities to be filtered at such values that the physical task of filtering may be economically achieved.

The directional indication is obtained by the use of a quadrature phase channel which requires two additional mixers 7 and 8, an additional doppler lowpass filter 9 and phase shifters 10 and 11. The signal from local oscillator 3 is shifted in phase by $\pi/2$ radians in phase shifter 10 and then heterodyned with the IF signal by mixer 7. The signal from local oscillator 6 is shifted in phase by $\pi/2$ radians in phase shifter 11 and is heterodyned by mixer 8 with the lowpass filtered output signal from mixer 7. The output of mixer 8 is subtracted from the output of mixer 5 by summing network 12 to provide the positive doppler shift and added by summing network 13 to provide negative doppler shift. The output of summing network 12 is fed to envelope demodulator 15 by way of narrowband filter 14 and the output of summing network 13 is fed to envelope demodulator 17 by way of narrowband filter 16. Output terminals 18 and 19 provide enhanced detected signals representative of positive and negative doppler, respectively. These output signals may be utilized in the display of the associated monostatic radar.

As described above, only one doppler frequency can be processed. Other doppler frequencies can be processed in a number of ways. One method is to step the frequency of local oscillator 6 to different values to cover the range of doppler frequencies of interest. Other ways include a bank of narrowband filters tuned to different doppler frequencies or a paired bank of identical narrowband filters each pair fed by a different local oscillator.

Narrowband filters 14 and 16 may be placed, if desired, immediately following mixers 5 and 8, respectively. The advantage of placing them as shown in the single FIGURE is that the two filters need not be closely matched to insure successful operation.

The outputs of envelope demodulators 15 and 17 may go directly to thresholds and display. If the doppler filter bandwidth is significantly greater than the reciprocal of the duration of the train of target pulses, the detecting sensitivity would be improved if an accumulator or "post detection" integrator follows each envelope demodulator. This refinement is well established in the art.

It is claimed:

1. A radar apparatus for use with a monostatic radar to determine target motion toward or away from the radar by determining the direction of doppler frequency shift imposed upon the reflected target pulse from a target of interest comprising first mixer means receiving an intermediate frequency output signal representative of said reflected target pulse, the intermediate frequency carrier frequency being $f_c$, first local oscillator means generating a first signal with a frequency of $f_c$, said first mixer heterodyning said intermediate frequency output signal and said first signal, first filter means to remove from the output of said first mixer means image components of frequencies near $2f_c$, second local oscillator means generating a second signal of a frequency $f_l$, second mixing means heterodyning said second signal and the output signal of said first filter means, first means to phase shift said first signal a predetermined magnitude to provide a first phase shifted signal, third mixing means heterodyning said intermediate frequency output signal and said first phase shifted signal, second means to phase shift said second signal a predetermined magnitude to provide a second phase shifted signal, second filter means for the output signal from said third mixer means, fourth mixer means heterodyning the output signal from said second filter means and said second phase shifted signal, first summing means to add the output signals from said second and fourth mixing means to provide a third signal representative of a negative doppler shift, and second summing means to subtract the output signals from said second and fourth mixer means to provide a fourth signal representative of a positive doppler shift.

2. A radar apparatus as described in claim 1 further including a first envelope demodulator, a first narrowband filter interconnecting said first summing means and said first envelope demodulator, a second envelope demodulator, and a second narrowband filter interconnecting said second summing means and said second narrowband filter.

3. A radar apparatus as described in claim 1 wherein said first and second phase shifting means operates to shift the phase of said first and second signals, respectively, $\pi/2$ radians.

* * * * *